`US010620703B2`

(12) United States Patent
El-Ouardi et al.

(10) Patent No.: US 10,620,703 B2
(45) Date of Patent: *Apr. 14, 2020

(54) ACTUATOR OF A TACTILE INTERFACE MODULE, TACTILE INTERFACE MODULE AND METHOD FOR GENERATING HAPTIC FEEDBACK

(71) Applicant: DAV, Créteil (FR)

(72) Inventors: Nour-Eddine El-Ouardi, Créteil (FR); Anthony Aubry, Creteil (FR)

(73) Assignee: DAV, Créteil (FR)

( * ) Notice: Subject to any disclaimer, the term of this patent is extended or adjusted under 35 U.S.C. 154(b) by 27 days.

This patent is subject to a terminal disclaimer.

(21) Appl. No.: 15/767,724

(22) PCT Filed: Oct. 13, 2016

(86) PCT No.: PCT/EP2016/074639
§ 371 (c)(1),
(2) Date: Sep. 7, 2018

(87) PCT Pub. No.: WO2017/064218
PCT Pub. Date: Apr. 20, 2017

(65) Prior Publication Data
US 2018/0364806 A1 Dec. 20, 2018

(30) Foreign Application Priority Data
Oct. 13, 2015 (FR) .................................... 15 59740

(51) Int. Cl.
*G09G 5/00* (2006.01)
*G06F 3/01* (2006.01)
(Continued)

(52) U.S. Cl.
CPC .............. *G06F 3/016* (2013.01); *B60K 35/00* (2013.01); *B60K 37/06* (2013.01);
(Continued)

(58) Field of Classification Search
CPC ........ G06F 3/016; G06F 3/03547; G06F 3/02; G06F 2203/014; G06F 2203/04104;
(Continued)

(56) References Cited

U.S. PATENT DOCUMENTS 5,894,263 A * 4/1999 Shimakawa ............. G08B 6/00
340/388.1
7,436,396 B2 * 10/2008 Akieda ................... G06F 3/016
345/156
(Continued)

FOREIGN PATENT DOCUMENTS

FR   2 938 669 A1   5/2010
FR   2 977 334 A1   1/2013
(Continued)

OTHER PUBLICATIONS

International Search Report issued in PCT/EP2016/074639 dated Jan. 16, 2017 (3 pages).
(Continued)

*Primary Examiner* — Duc Q Dinh
(74) *Attorney, Agent, or Firm* — Osha Liang LLP

(57) ABSTRACT

The invention relates to an actuator (7) which comprises: a frame (11) intended for being in contact with the tactile interface via a contact wall (13) so as to transmit haptic feedback to the tactile surface; a stator (15) connected to the frame (11); a movable core (19) connected via at least one resilient element to the frame (11) and intended for being moved by the stator (15) so as to generate the haptic feedback; an electromagnet (17) and at least one permanent magnet (20), one of which is supported by the stator and the other by the movable core (19). The actuator (7) also comprises a shock absorber (23) arranged between the movable core (19) and the contact wall (13), and said resilient element is sized so that, when the electromagnet is not powered, the movable core (19) applies a bearing force
(Continued)

towards the contact wall (13) and, when the electromagnet is powered according to a predetermined polarisation, the movable core (19) moves away from the contact wall (13).

12 Claims, 4 Drawing Sheets

(51) Int. Cl.
  *B60K 37/06* (2006.01)
  *G06F 3/0354* (2013.01)
  *B60K 35/00* (2006.01)
  *G06F 3/041* (2006.01)
  *H01H 3/00* (2006.01)

(52) U.S. Cl.
  CPC .......... *G06F 3/03547* (2013.01); *G06F 3/041* (2013.01); *B60K 2370/128* (2019.05); *B60K 2370/1438* (2019.05); *B60K 2370/158* (2019.05); *H01H 2003/008* (2013.01)

(58) Field of Classification Search
  CPC .......... G06F 2203/04808; G06F 3/041; G06F 3/0362; G06F 19/3468; G06F 2203/0339; G06F 2203/04102; G06F 3/048; G06F 3/04817; G06F 3/0482; G06F 3/04842; G06F 3/04847; G06F 3/0488; G06F 3/04883; G06F 3/04886; G06F 3/165; B60K 35/00; B60K 37/06; B60K 2370/128; B60K 2370/158; B60K 2370/1438; H01H 2003/008
  USPC .................................................. 345/173–175
  See application file for complete search history.

(56) References Cited

U.S. PATENT DOCUMENTS

| | | | |
|---|---|---|---|
| 2005/0225539 A1 | 10/2005 | Prados | |
| 2008/0119768 A1* | 5/2008 | Kobayashi | B06B 1/045 601/78 |
| 2011/0037546 A1* | 2/2011 | Marie | G06F 3/016 335/230 |
| 2015/0145783 A1* | 5/2015 | Redelsheimer | G06F 3/016 345/173 |

FOREIGN PATENT DOCUMENTS

| | | |
|---|---|---|
| WO | 2006/042309 A1 | 4/2006 |
| WO | 2014/006336 A2 | 1/2014 |

OTHER PUBLICATIONS

Written Opinion issued in PCT/EP2016/074639 dated Jan. 16, 2017 (8 pages).
French Written Opinion issued in Application No. 1559740 (7 pages).

* cited by examiner

ACTUATOR OF A TACTILE INTERFACE MODULE, TACTILE INTERFACE MODULE AND METHOD FOR GENERATING HAPTIC FEEDBACK

The present invention relates to an actuator for a haptic-feedback-providing touch-interface module, to a touch interface module and to a method for generating haptic feedback with a view to transmitting haptic feedback to a user.

In the motor-vehicle field, multifunction control modules, which for example take the form of a joystick or of a rotary button, are increasingly used to control electronic or electrical systems such as air conditioning systems, audio systems or even navigation systems.

Such modules may be associated with a display screen and allow drop-down menus including various commands relating to the systems to be controlled to be navigated.

However, the presence of an increasing number of increasingly complex functions has led to a multiplication of these modules. Thus, to increase the number of integrated functions and to improve the ergonomics of human-machine interfaces, use of an interface module comprising a control surface or indeed of a touch screen with a touch surface is considered to be an advantageous development.

When a user exerts pressure on the touch surface of such a sensor, it is possible to measure the pressure or force applied and/or to determine the location of the place where the pressure or force was exerted. In this case, a press of the user is for example associated with the selection of a command.

Furthermore, to signal to the user that his command has indeed been registered, whether this be in a normal driving situation or when stopped or in a degraded situation (manipulation blind or when under a substantial cognitive load), it is important for the user to receive haptic feedback so as to allow him to remain concentrated on the road and to decrease the cognitive effort associated with checking that the action of the user on the touch surface has been registered.

To achieve this end, haptic-feedback-providing control modules including actuators, such as electromagnetic actuators, that are connected to the interface module in order to transmit a vibrational movement, so that the user receives haptic feedback informing him that his command has indeed been registered, are already known.

These electromagnetic actuators include a stator with an electromagnet and a movable core with one or more permanent magnets, which core may move translationally with respect to the stator. By powering the electromagnet of the stator, the movable core is made to move and this movement is transmitted to the touchscreen.

A second type of actuator, called a "voice-coil" (or "bobine acoustique" in French) since it is associated with the technical principle of loudspeakers, is obtained in contrast by mounting the electromagnet so that it is able to move with respect to one or more fixed permanent magnets.

The Applicant's version of such an actuator for a haptic-feedback-providing touch-interface module is in particular known. The interface module comprises a touch surface that is able to detect a press of a user, and the actuator fastened to the touch surface includes:
 a chassis;
 a movable core that interacts with the chassis and that is intended to be driven to move between extreme positions in order to generate the haptic feedback; and
 an electromagnet-comprising stator that is configured to be able to drive the movable core to move with a translational back-and-forth movement.

Via an inertial effect, the movement given to the movable core by the stator is transmitted to the chassis, which in turn transmits the vibrational movement to a touch surface to which the actuator is fastened.

At rest, the movable core, which is spring-mounted, adopts a floating rest position.

When the electromagnet is supplied with AC power, the amplitude of the back-and-forth translational movements of the motion increases to reach a maximum.

Next, the supply of power to the electromagnet is stopped and the vibrations fade away gradually.

However, studies by the Applicant have shown that the first oscillations of the core are not perceivable by a user and delay the correspondence, as felt by the user, between, on the one hand, the application of a command, and on the other hand, the haptic feedback. In addition, the ratio between, on the one hand, the delivered electrical power and, on the other hand, the mechanical energy felt by the user is not optimal.

Specifically, it has been demonstrated that clear-cut and percussive haptic feedback is better perceived by a user. Thus the invention aims to at least partially mitigate the aforementioned drawbacks in particular by providing an actuator that generates an improved, and in particular more clear-cut, haptic sensation.

To this end, one subject of the invention is an actuator for a haptic-feedback-providing touch-interface module, the interface module comprising a touch surface that is able to detect at least one characteristic of a press of a user, the actuator including:
 a chassis that is intended to make contact with the touch interface via a contact wall in order to transmit haptic feedback to the touch surface;
 a stator that is connected to the chassis;
 a movable core that is connected, via at least one elastic element, to the chassis and that is intended to be driven to move by the stator in order to generate the haptic feedback; and
 an electromagnet and at least one permanent magnet, one of which is borne by the stator and the other of which is borne by the movable core,
characterized in that it also includes a damper that is placed between the movable core and the contact wall, and in that said elastic element is dimensioned so that in the non-powered state of the electromagnet the movable core applies a bearing force in the direction of the contact wall, and so that in a powered state in which the electromagnet is powered with a predefined bias the movable core separates from the contact wall.

Said actuator may furthermore have one or more of the following features, alone or in combination.

According to one aspect, the spring constant of said damper is between 7.5 and 12.5 times and in particular 10 times higher than the spring constant of said elastic element.

Said damper for example takes the form of a layer of an elastomer, a silicone layer in particular.

This elastomer layer may be overmolded on the movable core and/or be joined with the movable core by shape engagement.

The damper in particular has a hardness comprised between 25 and 35 and in particular of 30 shore A.

According to yet another aspect, the actuator comprises two elastic elements that are placed on two opposite lateral sides of the movable core, respectively.

The elastic elements may be springs, in particular helicoidal compression springs.

The invention furthermore relates to a haptic-feedback-providing touch-interface module, the interface module comprising a touch surface that is able to detect a press of a user, and at least one actuator such as defined above.

The invention also relates to a method for generating haptic feedback in a haptic-feedback-providing touch-interface module comprising a touch surface that is able to detect a press of a user, and at least one actuator such as defined above, characterized in that it includes steps in which:
the electromagnet is supplied with current in a first predefined bias direction so as to separate the movable core from the contact wall of the chassis against the force of said elastic element; and
the electromagnet is supplied with current in a second predefined bias direction that is opposite the first bias direction so that the direction of the current and thus the magnetic field is inverted in order to propel the movable core in the direction of the contact wall of the chassis and in order to maintain the movable core in abutment against this contact wall.

According to one aspect, the step for separating the movable core lasts between 4 ms and 6 ms, and in particular 5 ms.

According to another aspect, the step for propelling the movable core and maintaining it against the contact wall lasts between 4 ms and 6 ms, and in particular 5 ms.

Other advantages and features will become apparent on reading the description of the following figures, which are given by way of nonlimiting example.

In all the figures, elements that are the same have been referenced with the same references.

In certain figures, a Cartesian coordinate system X, Y, Z is indicated, making it possible to better comprehend the orientation of the elements with respect to one another. In the present description, the Z-direction is generally perpendicular to a touch surface, provided that the latter is planar and the X-Y plane parallel to the plane of this touch surface.

The embodiments described are examples. Although the description refers to one or more embodiments, this does not necessarily mean that each reference relates to the same embodiment, or that the features apply only to a single embodiment. Single features of various embodiments may also be combined to create other embodiments.

Figure 1:
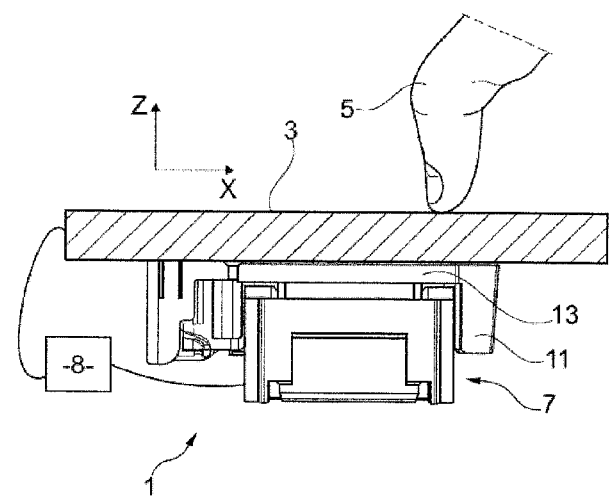
FIG. 1 is a schematic side view of one embodiment of a touch interface module with an actuator.

FIG. 1 schematically shows one embodiment of a haptic-feedback-providing touch-interface module 1 comprising a touch surface 3 that is able to detect a press, for example of a finger 5, of a user, and at least one haptic-feedback actuator 7. The number of actuators 7 may be two, three or four, or even more, and in particular depends on the size of the touch surface 3.

The haptic-feedback-providing touch-interface module 1, which is for example for a dashboard of a motor vehicle, or even for a central console of a motor vehicle, allows electronic or electrical systems of the vehicle to be controlled, and may transmit haptic feedback to a user who has for example modified or selected a command, so as to reassure the user that the selection or modification of the command has been registered.

The touch surface 3 may be planar, but, according to variants, it is also possible to envision outwardly curved or cambered shapes, or even shapes that are recessed. The touch surface 3 is for example equipped with a resistive or capacitive sensor for detecting at least the position of the finger 5 on the touch surface 3 and optionally in addition the path traced by the movement of the finger 5 and/or the pressure that the finger 5 exerts on the touch surface 3

This detection of the position of the finger 5 is for example associated with a pictogram-containing display menu and for example generates a control signal for controlling various pieces of equipment of a vehicle such as an air conditioning system, an audio system, a telephony system, inter alia.

The embodiment of FIG. 1 may be said to be of what is called "suspended actuator" type. By suspended, what is meant is that the actuator 7 is not connected to a casing of the touch-interface module 1, but only attached to the touch surface 3.

The actuator 7 therefore forms a well-defined functional unit that is easily installed in and uninstalled from the interface module 1. Specifically, this functional unit is simply screwed or clip-fastened to the touch surface 3, and may therefore be rapidly interchanged. The actuator 7 may optionally be fastened at lower cost by adhesive bonding, at the expense of interchangeability.

The interface module 1 furthermore comprises a controlling and processing unit 8 that is connected, on the one hand, to the touch surface 3, and, on the other hand, to the actuator 7.

The controlling and processing unit 8 is for example a programmable component comprising a processor, random access memory and storage memory, and allows instructions of a stored software package to be executed. It may be a question of an application specific integrated circuit (ASIC) or even of a programmable piece of equipment of the mini-PC type.

The controlling and processing unit 8 may also be connected to a display (not shown), a display screen such as an LED or LCD panel for example, allowing control menus of various pieces of equipment of the vehicle to be displayed.

In order to give the user, whose attention must not be deviated from the road in front of him, haptic feedback, the registration of a command is signaled by activation of the actuator 7, the movement of which is transmitted to the touch surface 3.

Figure 2:
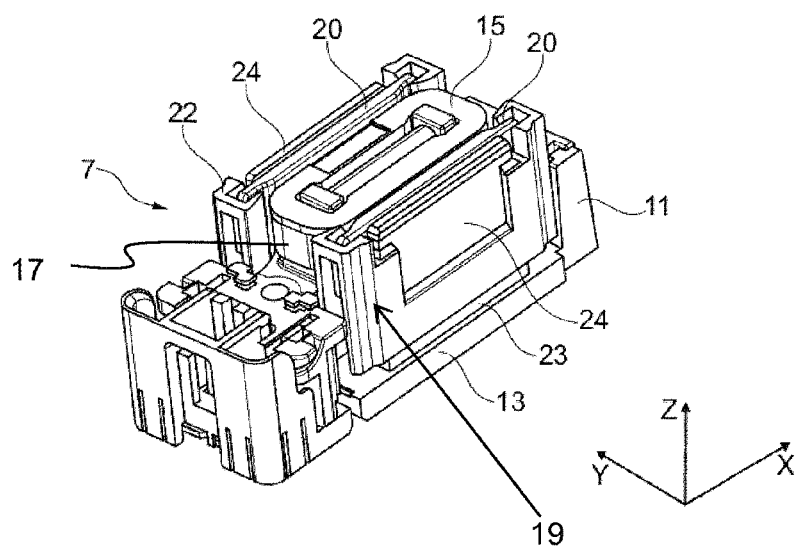
FIG. 2 is a schematic perspective view of the actuator of FIG. 1.
Figure 3:
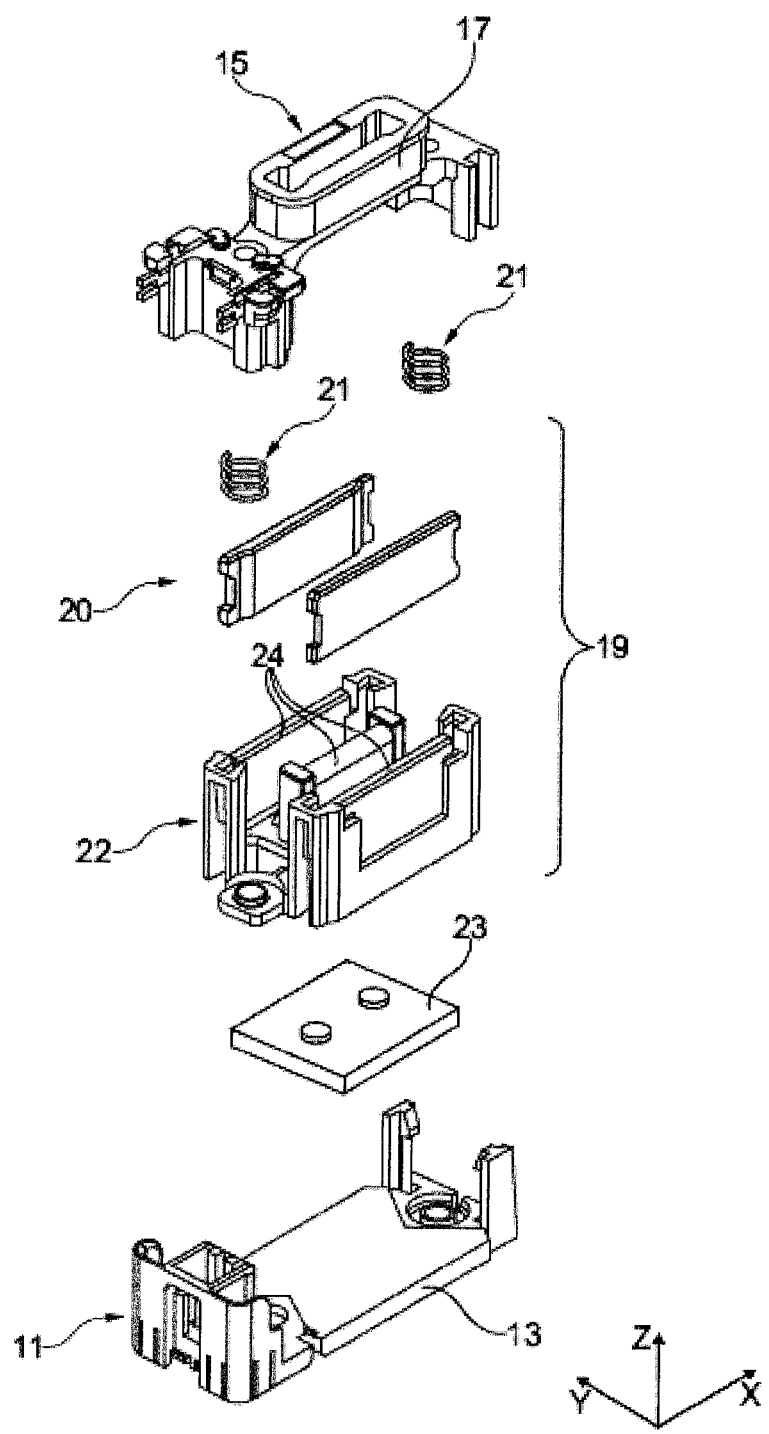
FIG. 3 is an exploded schematic perspective view of the actuator of FIG. 2.
Figure 4:
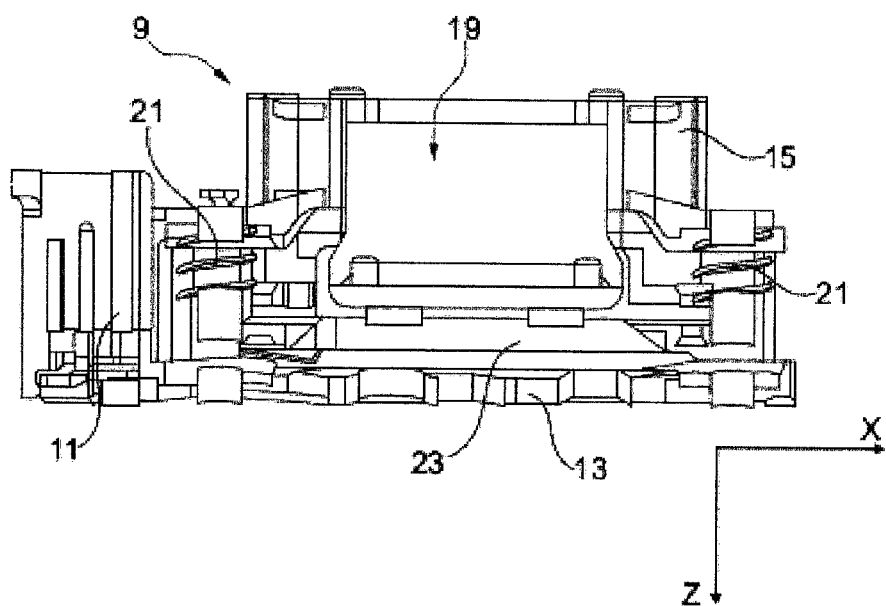
FIG. 4 is a schematic longitudinal cross-sectional view of the actuator of FIG. 2.

In FIGS. 2 to 4, the actuator 7 comprises a chassis 11 having a contact wall 13 that is fastened against the touch surface 3 in order to transmit haptic feedback.

The actuator 7 in addition comprises a stator 15 that is connected to the chassis 11, and includes an electromagnet 17, which is for example formed by winding an electrical wire, in particular one made of copper.

The stator 15 encircles a movable core 19 in order to allow the movable core 19 to be moved, along the Z-direction, translationally in two opposite directions that are perpendicular to the contact wall 13, in order to generate the haptic feedback. The movable core 19 in particular comprises permanent magnets 20 in the form of sheets. These permanent magnets are shown in a holder 22, which is for example made of plastic and which has, in cross section, an "E" shape.

The arms of the holder 22 in addition bear ferromagnetic metal plates 24 so as to increase the weight of the movable core 19, in order to increase the kinetic energy of the movable core 19, and so as to concentrate the field lines generated by the permanent magnets 20.

The movable core 19 is imprisoned between the contact wall 13 and the stator 15 and subjected to the force of at least one, and in the present case two, elastic elements 21.

For example, in the present embodiment these elastic elements 21 are springs, in particular helicoidal compression springs, that are placed on two opposite lateral sides of the movable core 19, respectively. More precisely, one end of each spring bears against the holder 22 and the other end bears against the stator 15.

It is also possible to use an elastic material, such as an expanded polymer of the urethane type, an ionomer (ionically cross-linked polymer), or a rubber.

The central oblong portion of the stator 15 bearing the electromagnet 17 interacts with the arms of the "E"-shaped holder 22 and guides the translational movement of the movable core 19 along Z.

The actuator 7 also includes a damper 23 that is placed between the movable core 19 and the contact wall 13.

The damper 23 for example takes the form of a layer or sheet of an elastomer, in particular of silicone, which may, according to a first variant, be overmolded onto the movable core 19 or may, according to a second variant, be joined with the movable core 19 by shape engagement as shown in FIG. 3. The damper has, by way of example, a thickness comprised between 1.5 mm and 2.5 mm, and in particular of 2 mm. As may be seen in FIGS. 2 to 4, the damper 23 is fastened to the back of the "E"-shaped holder 22.

According to one variant (not shown) the damper 23 is fastened to the contact wall 13. However, it is preferable for the damper 23 to be fastened to the movable core 19 in order to increase the weight of this group of moving parts and therefore the kinetic energy transmitted when it impacts the contact wall 13.

The damper 23 in particular has a hardness comprised between 25 and 35 and in particular of 30 shore A.

The one or more elastic elements 21 are dimensioned so that in the non-powered state of the electromagnet 17 the movable core 19 applies a bearing force in the direction of the contact wall 13, so that the damper 23 is pressed against the contact wall 13. In a powered state in which the electromagnetic is powered with a predefined bias, the movable core 19 separates from the contact wall 13.

The spring constant of said damper 23 is between 7.5 and 12.5 times and in particular 10 times higher than the spring constant of said elastic element 21.

Figure 5:
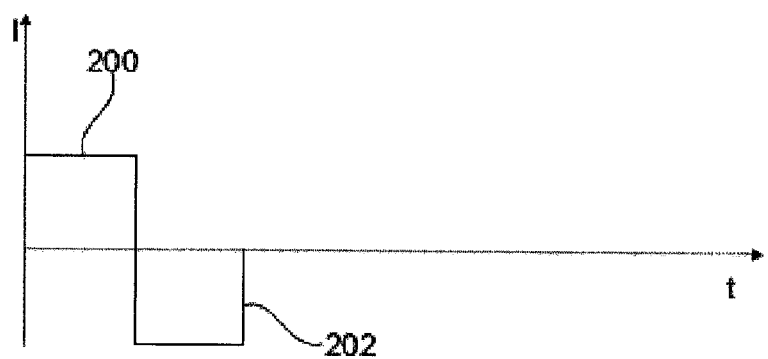
FIG. 5 is a graph of control signals applied to an actuator.
Figure 6:
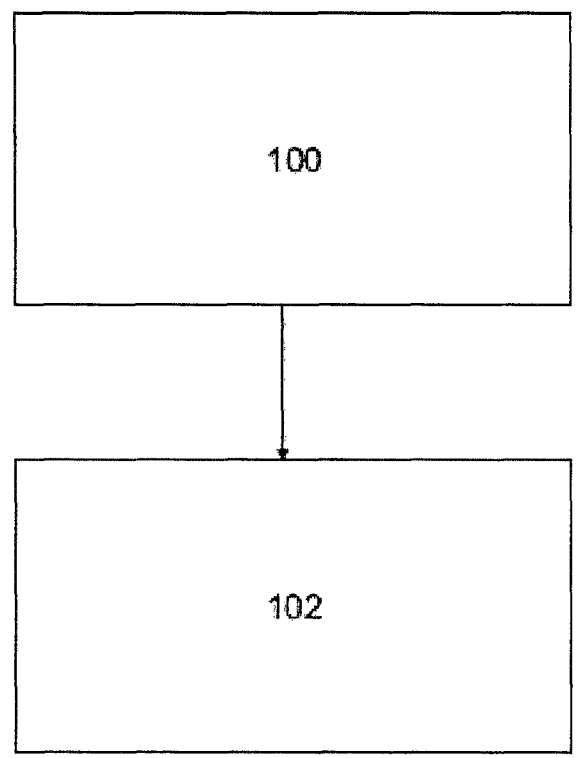
FIG. 6 is a flowchart of one embodiment of a method for generating haptic feedback.

FIG. 5 shows, as a function of time, a graph of control signals applied to an actuator 7, and FIG. 6 shows a flowchart of a method for generating haptic feedback according to one embodiment.

On reception of a signal from the touch surface 3, which signal was caused by a press of a finger 5, the controlling and processing unit 8 transmits, for example, in a step 100, a first signal 200 having a first predefined bias and for example taking the form of a square wave that supplies the electromagnet 17 with current in a first direction along the Z direction so as to separate the movable core 19 from the contact wall 13 of the frame 11, against the force of the elastic elements 21 (the compression springs compress).

The elastic elements 21 therefore store, in this phase, some of the kinetic energy communicated to the movable core 19.

Of course, the unit 8 may be configured to supply the electromagnetic 17 with current directly. However, according to one variant, it may also for example transmit a control signal to a relay through which power is supplied to the electromagnet 17.

The duration of this first signal 200 is sufficiently long that the separation of the movable core 19 is maximized, for example a duration comprised between 4 ms and 6 ms, and in particular of 5 ms.

Next, in a step 102, the controlling and processing unit 8 transmits a second signal 202 with a second predefined bias opposite the first bias, this signal for example also being a square wave, which inverts the direction of the current in order to invert the magnetic field so as to propel the movable core 19 in the direction of the contact wall 13 of the chassis 11 and to maintain the movable core 19 in abutment against this contact wall 13. The elastic elements 21 assist, in this phase, the movement of the movable core 19 (the compression springs relax).

Because the movable core 19 here only makes one round-trip, "percussive" haptic feedback, such as an impact that may be easily felt by the finger 5 of the user, is then obtained.

The duration of this second signal 202 is a duration comprised between 4 ms and 6 ms, and in particular of 5 ms.

Of course, the durations of the control signals 200 and 202 may be different. It is also possible to envision different forms of signals and different amplitudes without departing from the scope of the present description.

It will therefore be understood that the actuator 7 allows haptic feedback that is not only faster, but also more clear-cut and therefore better appreciated by the user, to be obtained.

Of course, other variants are envisionable without departing from the scope of the present description. Thus, the electromagnet 17 may be borne by the movable core 19 and the permanent magnet 20 by the stator for a "voice-coil" configuration.

The invention claimed is:

1. An actuator for a haptic-feedback-providing interface module, the interface module comprising a touch surface that is able to detect at least one characteristic of a press of a user, the actuator comprising:
    a chassis that is configured to make contact with the touch interface via a contact wall to transmit haptic feedback to the touch surface;
    a stator that is connected to the chassis;
    a movable core that is connected, via at least one elastic element, to the chassis and that is configured to be driven to move by the stator to generate the haptic feedback;
    an electromagnet and at least one permanent magnet, one of which is borne by the stator and the other of which is borne by the movable core; and
    a damper that is placed between the movable core and the contact wall, and wherein said elastic element is dimensioned so that in the non-powered state of the electromagnet the movable core applies a bearing force in the direction of the contact wall, and so that in a powered state in which the electromagnet is powered with a predefined bias the movable core separates from the contact wall.

2. The actuator as claimed in claim 1, wherein the spring constant of said damper is between 7.5 and 12.5 times higher than the spring constant of said elastic element.

3. The actuator as claimed in claim 1, wherein said damper takes the form of, a silicone layer.

4. The actuator as claimed in claim 3, wherein said elastomer layer is overmolded on the movable core.

5. The actuator as claimed in claim 3, wherein said elastomer layer is joined with the movable core by shape engagement.

6. The actuator as claimed in claim 1, wherein the damper has a hardness comprised between 25 and 35 shore A.

7. The actuator as claimed in claim 1, further comprising two elastic elements that are placed on two opposite lateral sides of the movable core, respectively.

8. The actuator as claimed in claim 1, wherein the one or more elastic elements are helicoidal compression springs.

9. A haptic-feedback-providing touch-interface module, the interface module comprising a touch surface that is able to detect a press of a user, and at least one actuator as claimed in claim 1.

10. A method for generating haptic feedback in a haptic-feedback-providing touch-interface module comprising a touch surface that is able to detect a press of a user, and at least one actuator as claimed in claim 1, the method comprising:
   supplying the electromagnet with current in a first predefined bias direction so as to separate the movable core from the contact wall of the chassis against the force of said elastic element; and
   supplying the electromagnet with current in a second predefined bias direction that is opposite the first bias direction so that the direction of the current and thus the magnetic field is inverted in order to propel the movable core in the direction of the contact wall of the chassis and in order to maintain the movable core in abutment against this contact wall.

11. The method as claimed in claim 10, wherein the step for separating the movable core lasts 5 ms.

12. The method as claimed in claim 10, wherein the step for propelling the movable core and maintaining it against the contact wall lasts 5 ms.

\* \* \* \* \*